United States Patent  [15] 3,694,464
Aaron et al.  [45] Sept. 26, 1972

[54] PREPARATION OF 1-ACETOXY-3-(ALKYL)-6,6,9-TRIMETHYL-7,8,9,10-TETRAHYDRO-6H-DIBENZO[b,d]PYRAN ISOMERS

[72] Inventors: Herbert S. Aaron, Baltimore; Clyde Parker Ferguson, Jr., Bel Air, both of Md.

[73] Assignee: The United States of America as represented by the Secretary of the Army

[22] Filed: July 10, 1968

[21] Appl. No.: 743,907

[52] U.S. Cl..........260/345.3, 260/521 R, 260/611 A, 260/999, 424/283
[51] Int. Cl. ...............................................C07d 7/04
[58] Field of Search....260/345.3, 520, 521 R, 611 A

[56] References Cited

UNITED STATES PATENTS 2,509,387  5/1950  Adams....................260/345.3

Primary Examiner—Leland A. Sebastian
Attorney—Harry M. Saragovitz, Edward J. Kelly, Herbert Berl and Jacob Ziegler

[57] ABSTRACT

A novel process and novel intermediates in the synthesis of the novel optically-active isomers of 1-acetoxy-3(alkyl)-9-methyl-7,8,9,10-tetrahydro-6H-dibenzo[b,d]pyran as incapacitating agents. Those intermediates are prepared by reducing a mixture comprising a ketone, an alcohol and borohydride to the carbinol, treating said carbinol with a trihalide and converting the trihalide product to a malonic ester, hydrolyzing said ester and separating the aqueous phase, acidifying said aqueous phase results in the preparation of an isomeric mixture of alkyl-dialkoxyhydrocinnamic acid.

6 Claims, No Drawings

PREPARATION OF 1-ACETOXY-3-(ALKYL)-6,6,9-TRIMETHYL-7,8,9,10-TETRAHYDRO-6H-DIBENZO[ ] PYRAN ISOMERS

DEDICATORY CLAUSE

The invention described herein may be manufactured, used, and licensed by or for the Government for governmental purposes without the payment to us of any royalty thereon.

This invention relates to the preparation of various stereoisomers of tetrahydrocannabinol congeners.

The object of this invention is the process for preparing the various optical isomers of 1-hydroxy-3-(1,2-dimethylheptyl)-6,6,9-trimethyl-7,8,9,10-tetrahydro-6 H-dibenzo[b,d]pyran and its corresponding acetate derivative.

It is a further objective to prepare a new intermediate compound in order to prepare the final isomers.

The synthesis of the racemic mixture of the tetrahydrocannabinol congener 1-hydroxy-3-(1,2-dimethylheptyl)-6,6,9-trimethyl-7,8,9,10-tetrahydro-6 H-dibenzo[b,d]pyran is described by Adams et al., J. Am. Chem. Soc., 67, 1534 (1945); Adams et al., ibid, 70, 664 (1948). The procedure is summarized in part:

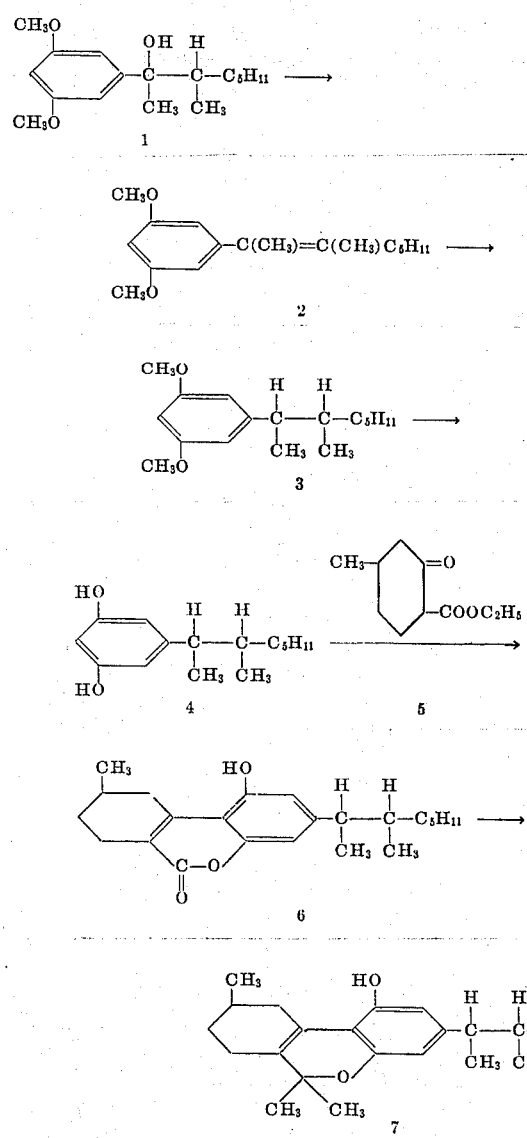

By this path, carbinol 1 obtained in two steps from 3,5-dimethoxybenzamide was dehydrated to the olefin 2, and then reduced to the alkane compound 3 which was demethylated to compound 4 and condensed with 2-carbethoxy-5-methylcyclohexanone to prepare pyrone 6 then to pyran 7.

Reinvestigation of the Adams et al reaction sequence revealed that the dehydration tends to give, initially, the vinyl olefin:

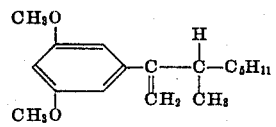

which then rearranges into a cis/trans mixture of compound 2 under the acidic conditions. However, all attempts to separate any of these intermediates into the stereoisomers bore no fruit.

In view of these findings, we investigated various compounds functioning as an intermediate which would be separable into an isomeric form suitable to prepare the optically-active isomers of final compound 7. This intermediate as the key is α-amyl-β-methyl-3,5-dimethoxyhydrocinnamic acid thus permitting the separation into the erythro and threo configurations as below:

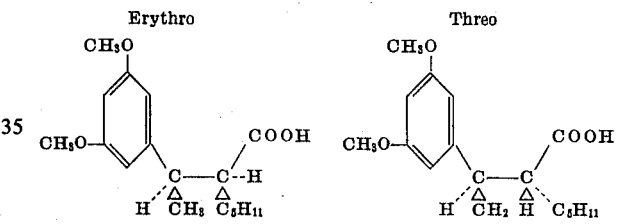

The erythro and threo configurations of the stereoisomers of final compound, 1-acetoxy-3(1,2-dimethylheptyl)-6,6,9-trimethyl-7,8,9,10-tetrahydro-6 H-dibenzo[b,d]pyran are:

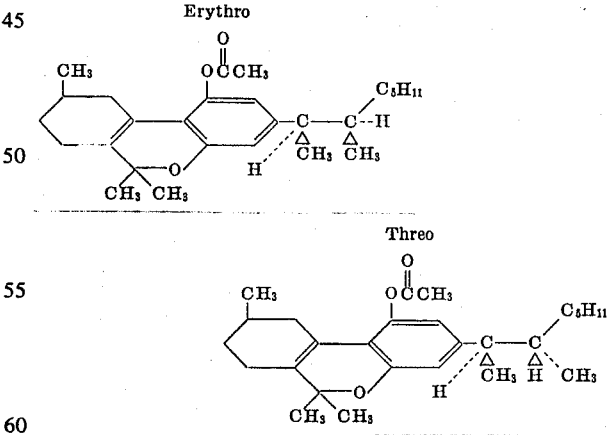

The method according to our invention is utilizing 3,5-dimethoxyacetophenone (10) as the starting material which was reduced with sodium borohydride to the corresponding carbinol (11), which was then treated with phosphorus tribromide to form the corresponding bromo analog [α-(3,5-dimethoxyphenyl)ethylbromide], which was not isolated, but was reacted with a $C_1$ to $C_4$ dialkyl malonate in a malonic ester synthesis. The resulting product, which was not isolated, was hydrolyzed with alkali metal hydroxide then acidified and decarboxylated by refluxing in xylene or diethylene glycol dimethyl ether to form compound 12, α-amyl-β-methyl-3,5-dimethoxyhydrocinnamic acid. The latter compound is an isomeric mixture that was separated into an erythro isomer salt with dicyclohexylamine, and a threo isomer salt with benzylamine. Separately the erythro and threo isomers were regenerated from their salts and then each separate isomer was treated with the *d* and *l* forms of α-methylbenzylamine producing four separate isomers, that is, *d* and *l* erythro form and *d* and *l* threo form. Each of the latter four optical isomers was reduced with lithium aluminum hydride to give its corresponding alcohol optical isomers, that is 2-(amyl)-3-(3,5-dimethoxyphenyl)butanol compound (13). Each isomer of compound 13 was converted to the p-toluenesulfonate ester, e.g., 2-(amyl)-3-(3,5-dimethoxyphenyl)butyl-p-toluenesulfonate, which was not isolated but reduced with lithium aluminum hydride to the four isomers of compound 3, 2-(3,5-dimethoxyphenyl)-3-methyloctane. Each of the latter four optical isomers was demethylated (compound 4), then separately treated with the *d* and *l* forms of 2-carbethoxy-5-methylcyclohexanone (compound 5), producing the corresponding eight isomers 1-hydroxy-3-(1,2-dimethylheptyl)-9-methyl-7,8,9,10-tetrahydro-6H-dibenzo[b,d]pyrone, compound 6. The latter each isomer was converted into the corresponding pyran compound 7, then to the corresponding acetate ester 1-acetoxy-3-(1,2-dimethylheptyl)-6,6,9-trimethyl-7,8,9,10-tetrahydro-6H-dibenzo[b,d]pyran-(acetate of 7).

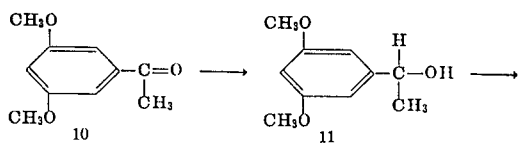

10 → 11 →

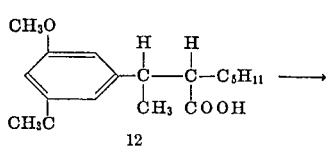

12 →

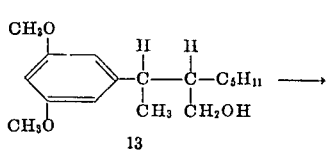

13 →

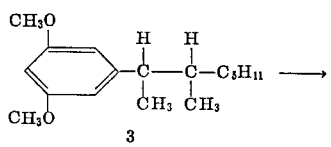

3

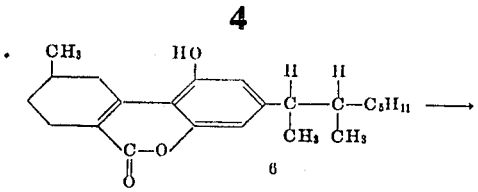

6 →

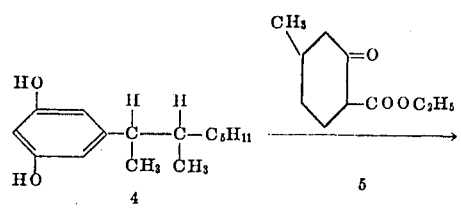

4 → 5 →

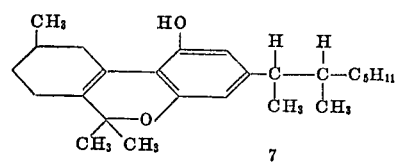

7

The alcohols which may be employed are lower alkyl alcohols containing from one to four carbon atoms and polyhydric alcohols as ethylene glycol or 1,2,3-propanetriol.

The extracting medium may be diethyl ether, benzene, toluene or trichloromethane.

The pharmacological evaluation of the compounds described in this disclosure was determined by Visual Discrimination Test (VDT), lethal or minimum dose for potency was administering intravenously various proportions (milligrams/kilogram) of the compound into various test animals e.g., mice or monkey, using the method of the "The Search For and Selection of Toxic Chemical Agents for Weapons Systems" disclosed in the Edgewood Arsenal, Maryland Publication (CRDL SOP 70–3, 6 May 1965).

Visual Discrimination Test procedure is a conditioned avoidance-escape task combined with a choice discrimination task employing a primate, monkey, as a test animal.

$LD_{50}$ is the lowest dose in milligrams in compound per kilogram of animal required to be lethal in 50% of the tested animals. $MED_{50}$ is the lowest dose in milligrams of compound per kilogram of animal required to give any visible physiological effects (e.g., locomotor) in 50% of the tested animals. The quotient of the ratio $LD_{50}/MED_{50}$ is the margin of safety that is the higher the numerical quotient the greater the proportion of agent can be used before causing death and therefore a better incapacitating agent.

Tables I and II describe the activity based upon the aforementioned Maryland Publication.

TABLE I

Visual Discrimination Test—Monkey

| Compound | Proportion (0.1 mg/kg |
|---|---|
| B | Negative |
| Isomer 1 | Positive |
| Isomer 2 | Positive |
| Isomer 3 | Negative |
| Isomer 4 | Positive |
| Isomer 5 | Negative |
| Isomer 6 | Positive |
| Isomer 7 | Negative |
| Isomer 8 | Negative |
| Isomer 1–8 | Negative |

B: Racemate; 1-acetoxy-3-(1,2-dimethylheptyl)-6,6,9-trimethyl-7,8,9,10-tetrahydro-6H-dibenzo[b,d]pyran (acetate of 7), prepared according to Adams.
Isomers 1 through 8: are the separated optically-active isomers of the racemate prepared according to this invention.
Isomer 1–8: is the separated optically-active isomers 1 through 8 are recombined to form a racemate mixture.

TABLE II

| Compound | Potency (Mice) | | |
|---|---|---|---|
| | $LD_{50}$ | $MED_{50}$ | $LD_{50}/MED_{50}$ |
| A | 10.0 | 0.32 | 31 |
| B | 72.5 | 0.10 | 725 |

A: 1-hydroxy-3-(1,2-dimethylheptyl)-6,6,9-trimethyl-7,8,9,10-tetrahydro-6H-dibenzo[b,d]pyran, racemate.
B: 1-acetoxy-3-(1,2-dimethylheptyl)-6,6,9-trimethyl-7,8,9,10-tetrahydro-6H-dibenzo[b,d]pyran (acetate of 7), racemate.

We have found unexpected and unobvious results in the ability of the test animal to carry out the conditional avoidance-escape task which is directly relatable to incapacitation activity (Table I). The racemic mixture demonstrated no activity as compared with the positive responses upon employment of the optically-active isomers. In addition, recombining the separated isomers into a synthetic racemate, "Isomer 1–8", there was again no activity as demonstrated by the original racemate. We have clearly shown that the isolated isomers have desirable incapacitating activity not shown by the racemate. As is well recognized, the activity of the racemate is carried forward to the isomers with greater effect. Here, we have shown that the racemate produces no activity and the Isomers 1, 2, 4, and 6 did exhibit activity as reflected in the positive notation in Table 1.

EXAMPLE 1

Preparation of α-(3,5-dimethoxyphenyl)ethanol.

A mixture comprising about 83 g (0.46 mole) of 3,5-dimethoxyacetophenone in 50 ml of methanol added dropwise with stirring to a solution of 18 g of sodium borohydride in 300 ml of methanol containing 1g of sodium hydroxide as refluxed for about 30 minutes. The methanol was removed in a distillation step and about 100 ml of water was added during said step. The reacted mixture was cooled, extracted with several portions of ether, e.g. diethyl ether, being combined, dried, filtered, concentrated and distilled gave about 80 g of α-(3,5-dimethoxyphenyl)ethanol, compound 11.

EXAMPLE 2

A mixture comprising about 28.5 g (0.16 mole) of α-(3,5-dimethoxyphenyl) ethanol in 70 ml of ether in an ice bath was treated with dropwise addition requiring about 1 hour of phosphorus tribromide solution comprising 18 ml phosphorus tribromide and 70 ml ether with subsequent warming to room temperature, then refluxed for about 2 hours on a steam bath, cooled and poured over crushed ice. The reacted mixture was extracted with 3 portions of ether. The ether extracts were combined and washed with 10% solution of bicarbonate, then water and dried gave α-(3,5-dimethoxyphenyl)ethylbromide solution which was concentrated by ether removal on a steam bath, then under anhydrous conditions with subsequent addition to a solution comprising about 42 g (0.18 mole) diethyl n-amylmalonate and 300 ml of anhydrous ethanol containing about 4.6g (0.20 mole) of freshly dissolved sodium. The mixture was stirred at room temperature for about 100–140 minutes. Mild distillation then removed the ether and completed the reaction. Distillation was continued with water addition when the head temperature was about 76°–80° C. and additional water was added until head temperature was about 95°–103° C. The mixture was then cooled and extracted with three 250 ml portions of ether which were combined and concentrated by distillation to give rise to the crude α-(3,5-dimethoxyphenyl) amylmalonate. The latter ester was hydrolyzed with stirring for about 5–7 hours at 150°–170° C. in ethylene glycol containing about 35 g of sodium hydroxide, then subsequently cooled, diluted to 1,500 ml with water and washed with ether. The aqueous phase was acidified e.g., mineral acid, e.g., $H_2SO_4$ or HCl, and extracted with four 200 ml portions of ether. The extracts were combined, concentrated by distillation on a steam bath and the residue as taken up in 150 ml of xylene, distilled to remove residual ether and water and then refluxed (head temperature of 130°–150° C.) for about 6 hours. The xylene was removed under reduced pressure of 0.10 – 0.20 mm at a pot temperature of 115° C. and gave crude α-amyl-β-methyl-3,5-dimethoxyhydrocinnamic acid as an isomeric mixture, compound 12.

EXAMPLE 3

Preparation of Acid Isomer I —(erythro)

a. A mixture comprising about 34g of crude α-amyl-β-methyl-3,5-dimethoxyhydrocinnamic acid, Example 2, was dissolved with warming in about 100-150 ml of ether, then combined with 22–26 g of dicyclohexylamine and placed overnight in the cold, filtered and gave about 19 g of salt and Filtrate I. The salt dicyclohexylamine derivative, m.p. 131°–135° C was recrystallized from about 250 ml acetone with m.p. about 138°–140° C.

Anal. Calcd. for $C_{29}H_{49}NO_4$:  C, 73.2; H 10.4; O, 13.5; equiv. wt. 476
Found:  C, 73.6; H, 10.6; O, 13.5; equiv. wt. 477 b. The salt, from (a) supra, was dissolved in a solution comprising 30-40 ml of methanol, acidified with 10-15 ml of 6N hydrochloric acid and diluted with 800 to 1,000 ml water formed an oil upon cooling, scratched and gave 10 g of *dl-α-amyl-β-methyl*-3,5-dimethoxyhydrocinnamic acid, erythro, m.p. 55°–57° C., which was recrystallized from petroleum ether.

EXAMPLE 4

Preparation of Acid Isomer II, Threo.

a. Filtrate I, Example 3(a) was treated with aqueous HCl and ether and the aqueous phase was extracted with several portions of ether, which were combined, dried and concentrated to 300–400 ml with subsequent treatment of about 8–10 g of benzylamine in a little ether gave about 19 g of the corresponding insoluble benzylamine derivative, m.p. 113°–116° C. and Filtrate II. The salt derivative was recrystallized from 140–160 ml benzene and gave about 17 g of the derivative, m.p. 121°–122° C.

Anal. Calcd. for $C_{24}H_{35}NO_4$: C, 71.8; H, 8.8; O, 15.9; N, 3.5
Found: C, 71.7; H, 8.8; O, 16.0; N, 3.4 b. The benzylamine derivative, from (a) supra, dissolved in a solution comprising 25–35 ml methanol, acidified with 10–15 ml 6N hydrochloric acid and 175–200 ml water formed an oil which solidified in the cold and gave about 11g of *dl-α-amyl-β-methyl*-3,5-dimethoxyhydrocinnamic acid, Acid Isomer II (threo), m.p. 54°–57° C., recrystallized from petroleum ether, m.p. 55°–57° C.

Anal. Calcd. for $C_{17}H_{26}O_4$: C, 69.4; H, 8.9; O, 21.7; neut. equiv., 294.
Found: C, 68.9; H, 8.5; O, 21.4; neut. equiv., 294.

EXAMPLE 5 a. A mixture comprising about 35g of *dl*- acid isomer I, (erythro), *dl-α-amyl-β*-3,5-dimethoxyhydrocinnamic acid, Example 3(b), and an equivalent amount *l-α*-methylbenzylamine in ether (2 to 5 ml per/g of amine) gave *l-α*-methylbenzylamine · d-Acid Isomer I (salt), which was recrystallized at least twice from ether (10 ml/g) and gave about 5 g of the above salt, m.p. 96°–98° C., $[\alpha]_D^{26}$ +22.0°(methanol, c 2.0).

b. The amine salt, from (a) supra, was dissolved in 2N aqueous sodium hydroxide (10 ml/g), washed with ether, followed by petroleum ether, acidified e.g., excess hydrochloric acid, cooled, and gave d-α-amyl-β-methyl-3,5-dimethoxyhydrocinnamic acid, Acid Isomer I, erythro, m.p. 49°–52° C., $[\alpha]_D$ +35.6° (methanol, c. 2.2).

EXAMPLE 6 a. The procedure in accordance with Example 5(a) was repeated with the exception of substituting *d-α*-methylbenzylamine for the *l-α*-methylbenzylamine and produced about 9 g of *d-α*-methylbenzylamine · *l*-acid isomer I, m.p. 96°–98° C., $[\alpha]_D^{25}$ −21.8°(methanol, c 2.0).

b. The procedure in accordance with Example 5(b) was repeated with the exception of substituting *d-α*-methylbenzylamine · *l*-acid isomer I for the *l-α*-methylbenzylamine · d-acid isomer I, and gave *l-α-amyl-β*-methyl-3,5-dimethoxyhydrocinnamic acid, acid isomer I, erythro, m.p. 49.5°–53° C., $[\alpha]_D$ −35.2°(methanol, c 2.0).

EXAMPLE 7 a. A mixture comprising 180–210 g of *dl*-acid isomer II, threo, from Example 4(b), *d-α*-methylbenzylamine and ether (2–5 ml per/g amine) gave the insoluble partially resolved *d-α*-methylbenzylamine · *l*-acid isomer II (salt) which was separated from Filtrate III. The said salt was recrystallized at least five times from ether (15 ml/g) and then recrystallized at least four times from ethyl acetate (5 ml/g) and gave about 11 g substantially of *d-α*-methylbenzylamine · *l*-acid isomer II, $[\alpha]_D$ −5.0° (c 4.3).

b. The procedure in accordance with Example 5(b) was followed with the exception of substituting the *d-α*-methylbenzylamine · *l*-acid isomer II, Example 7(a), for *l-α*-methylbenzylamine · d-acid isomer I and gave *l-α*-amyl-β-methyl-3,5-dimethoxyhydrocinnamic acid, acid isomer II, threo, m.p. 78°–81° C., $[\alpha]_D$ −6.7° (methanol, c 3.7).

EXAMPLE 8 a. The procedure in accordance with Example 7(a) was repeated with the exception of substituting the *l-α*-methylbenzylamine for the *d-α*-methylbenzylamine and gave about 12 g of partially resolved salt *l-α*-methylbenzylamine · d-α-amyl-β-methyl-3,5-dimethoxyhydrocinnamic acid, $[\alpha]_D$ + 5.0° (methanol, c 3.5).

b. The procedure in accordance with Example 5(b) was repeated with the exception of substituting *l-α*-methylbenzylamine · *d-α*-amyl-β-methylbenzylamine · *d*α-amyl-β-methyl-3,5-dimethoxyhydrocinnamic acid (Amine · Acid Isomer I) and gave *d-α*-amyl-β-methyl-3,5-dimethoxyhydrocinnamic acid, acid isomer II, threo, m.p. 47°–53° C., $[\alpha]_D$ + 7.1° (methanol, c 3.5).

EXAMPLE 9 a. A mixture comprising about 14.5 g (0.049 mole) of the optically-active isomer *d-α-amyl-β-methyl*-3,5-dimethoxyhydrocinnamic acid, acid isomer I, erythro, Example 5(b) or *d-α*-amyl*β*-methyl-3,5-dimethoxyhydrocinnamic acid, acid isomer II, threo, Example 8(b), 5–7 g (excess) lithium aluminum hydride and 200–300 ml ether was refluxed for 6–8 hours, cooled and decomposed by successive additions of methanol in ether, then water and finally dilute hydrochloric acid. The aqueous layer was separated, saturated with sodium chloride and extracted with several portions of ether which were combined further extracted with aqueous bicarbonate, the latter acidified without any precipitation indicating complete reaction. The latter treated ether extract was dried, concentrated and distilled (b.p. 134°–138° C./1/μ) produced the optically-active isomers, compound 13, *d*-2-(amyl)-3-(3,5-dimethoxyphenyl)butanol, alcohol isomer I, erythro $[\alpha]_D$ + 35.2° (methanol, c 2.5), $n_D^{25}$ 1.5126 or *d*-2-(amyl)-3-(3,5-dimethoxyphenyl)butanol, alcohol isomer II, threo, $\alpha_D$+2.4° (neat, 1 dm), $n_D^{25}$ 1.5130.

b. The procedure according to (a) supra, was repeated with the exception of substituting *l*-α-amyl-β-methyl-3,5-dimethoxyhydrocinnamic acid, *l*-acid isomer I, erythro, Example 6(b), for the *d*-α-amyl-β-methyl-3,5-dimethoxyhydrocinnamic acid and gave optically-active isomer *l*-2-(amyl)-3-(3,5-dimethoxyphenyl)butanol, alcohol isomer I, erythro, $[\alpha]_D -34.4°$ (methanol, c 2.3), $n_D^{25}$ 1.5113.

c. The procedure according to (a) supra was repeated with the exception of substituting *l*-α-amyl-β-methyl-3,5-dimethoxyhydrocinnamic acid, acid isomer II, threo, Example 7(b), for the corresponding acid isomer I and gave *l*-2-(amyl)-3-(3,5-dimethoxyphenyl)butanol, alcohol isomer II, threo, $n_D^{25}$ 1.5128.

EXAMPLE 10A a. A mixture comprising about 12 g (0.040 mole) of the optically active isomer, *d*-2-(amyl)-3-(3,5-dimethoxyphenyl)butanol, alcohol isomer I, erythro, Example 9(a) and p-toluenesulfonyl chloride (8.5 g, 0.044 mole), each dissolved in 10–15 ml of ice cold dry pyridine, were placed under freezing conditions, e.g., refrigerator freezer, for 15–17 hours, with subsequent pouring over ice, then extracted with several portions of ether which were combined, washed with cold dilute hydrochloric acid (or $H_2SO_4$) until wash water was acidic (pH 1–3).

b. The reduction mixture comprising the combined ether extracts, from (a) above, washed with aqueous bicarbonate, dried, and added in a dropwise manner to a stirring mixture comprising 3–5 g of lithium aluminum hydride and 75 ml ether, was refluxed for 4–5 hours, cooled and decomposed by successive additions of methyl alcohol in ether, then water, and finally dilute hydrochloric acid. The aqueous layer was separated, saturated with sodium chloride and extracted with several portions of ether which were combined, washed with aqueous bicarbonate, then dried and concentrated. The undistilled portion contained the reduced product was eluted with 600 ml of petroleum ether on an activated alumina (1 × 4 in.) column.

c. The petroleum ether eluted from (b) above was concentrated, distilled, and gave the *d*-2-(3,5-dimethoxyphenyl)-3-methyloctane, threo, $[\alpha]_D +36.9°$ (methanol, c 3.4), $n_D^{25}$ 1.4980.

EXAMPLE 10B

The procedure according to Example 10A was repeated with the exception of substituting *l*-2-(amyl)-3-(3,5-dimethoxyphenyl)butanol, erythro, Example 9B, for the corresponding alcohol isomer I, erythro, and gave *l*-2-(3,5-dimethoxyphenyl)-3-methyloctane, threo, $[\alpha]_D -36.2°$ (methanol, c 3.3), $n_D^{25}$ 1.4974.

EXAMPLE 10C

The procedure according to Example 10A was repeated with the exception of substituting *l*-2-(amyl)-3-(3,5-dimethoxyphenyl)butanol, acid isomer II, threo, Example 9(c), for the corresponding alcohol isomer I, erythro, and gave *l*-2-(3,5-dimethoxyphenyl)-3-methyloctane, erythro, $\alpha_D -3.2°$ (neat, 1 dm) $n_D^{25}$ 1.4986.

EXAMPLE 10D

The procedure according to Example 10A was repeated with the exception of substituting *d*-2-(amyl)-3-(3,5-dimethoxyphenyl)butanol, alcohol isomer II, threo, Example 9(d), for the corresponding alcohol isomer I, erythro, and gave *d*-2-(3,5-dimethoxyphenyl)-3-methyloctane, erythro, $\alpha_D +3.0°$ (neat, 1 dm), $n_D^{25}$ 1.4967.

EXAMPLE 11 a. A mixture comprising d-2-(3,5-dimethoxyphenyl)-3-methyloctane, threo, Example 10A, with about 48 % hydrobromic acid in glacial acetic acid under reflux for about 4–6 hours gave rise to a viscous yellow oil, *d*-2-(3,5-dihydroxyphenyl)-3-methyloctane, threo.

b. The procedure according to (a) supra, was repeated with the exception of substituting *l*-2-(3,5-dimethoxyphenyl)-3-methyloctane, threo, Example 10B, for the corresponding dextrorotatory octane and gave a yellow viscous oil *l*-2-(3,5-dihydroxypheny)-3-methyloctane, threo.

c. The procedure according to (a) supra, was repeated with the exception of substituting *l*-2-(3,5-dimethoxyphenyl)-3-methyloctane, erythro, Example 10C, for the corresponding dextrorotatory octane, threo, and gave *l*-2-(3,5-dihydroxyphenyl)-3-methyloctane, erythro.

d. The procedure according to (a) supra, was followed with the exception of substituting *d*-2-(3,5-dimethoxyphenyl)-3-methyloctane, erythro, Example 10D, for the corresponding dextrorotatory octane, threo, and gave *d*-2-(3,5-dihydroxyphenyl)-3-methyloxtane, erythro.

EXAMPLE 12A a. A mixture comprising 2.5 to 3.0g of *d*-2-(3,5-dihydroxyphenyl)-3-methyloctane, threo, Example 11(a), in 20 ml of dry benzene was treated with 3.0 to 3.5 g of *d*-2-carbethoxy-5-methylcyclohexanone in 20 ml of dry enzene and 1.6 to 1.8 g of phosphorus oxychloride. The mixture was refluxed for 4–5 hours, then diluted with 75 ml of benzene. The benzene solution was washed with 10% sodium bicarbonate, dried and concentrated, then chromatographed on activated alumina (1 × 4 in.) benzene. The column was eluted with 50 ml portions of 5, 10 and 50% acetone in benzene, then acetone and finally methanol. The first two eluant fractions were evaporated and the residues were triturated with petroleum ether to give tan solids. They were combined and recrystallized utilizing the charcoal treatment from cyclohexane and gave an off-white to tan powder of *d*-1-hydroxy-3-(1,2-dimethylheptyl)-9-methyl-7,8,9,10-tetrahydro-6H-dibenzo[b,d]pyrone, threo, isomer 3, m.p. 133°–135° C., $[\alpha]_D +\frac{1}{6}°$ (methanol, c 1.8).

b. The procedure according to (a) supra was repeated with the exception of substituting *l*-2-carbethoxy-5-methylcyclohexanone for the corresponding dextrorotatory hexanone and gave *l*-1-hydroxy-3-(1,2-dimethylheptyl)-9-methyl7,8,9,10-tetrahydro-6H-dibenzo[b,d] pyrone, threo, isomer 4, m.p. 141°–143° C., $[\alpha]_D -67°$ (methanol, c 2.0).

EXAMPLE 12B a. The procedure according to 12(a) was repeated with exception of substituting $l$-2-(3,5-dihydroxyphenyl)-3-methyloctane, threo, Example 11 (b) for the corresponding dextrorotatory octane and gave $d$-1-hydroxy-3-(1,2-dimethylheptyl)-9-methyl-7,8,9,10-tetrahydro-6H-dibenzo [$b,d$]pyrone, threo, isomer 1, m.p. 142°–143°, $[\alpha]_D+71°$ (methanol, c 1.9).

b. The procedure according to 12(a) was repeated with the exception of substituting $l$-2-(3,5-dihydroxyphenyl)-3-methyloctane, threo, and $l$-2-carbethoxy-5-methylcyclohexanone for the corresponding dextrorotatory octane and dextrotatory hexanone respectively and gave $l$-1-hydroxy-3-(1,2-dimethylheptyl)-9-methyl-7,8,9,10-tetrahydro-6H-dibenzo[$b,d$]pyrone, threo, isomer 2, m.p. 131°–133° C., $[\alpha]_D-146°$ (methanol, c 1.9).

EXAMPLE 13A a. The procedure according to Example 12A(a) was repeated with the exception of substituting $d$-2-(3,5-dihydroxyphenyl)-3-methyloctane, erythro, Example 11(d) for the corresponding $d$-2-(3,5-dihydroxyphenyl)-3-methyloctane, threo, and gave $d$-hydroxy-3-(1,2-dimethylheptyl)-9-methyl-7,8,9,10-tetrahydro-6H-dibenzo[$b,d$]pyrone, erythro, isomer 7, m.p. 135.5°–137.5° C., $[\alpha]_D+118°$ (methanol, c 0.7). The procedure according to (a) supra was repeated with the exception of substituting $l$-2-carbethoxy-5-methylcyclohexanone for the corresponding dextrorotatory hexanone and gave $l$-1-hydroxy-3-(1,2-dimethylheptyl)-9-methyl-7,8,9,10-tetrahydro-6H-dibenzo[$b,d$]pyrone, erythro, isomer 8, m.p. 135°–138° C., $[\alpha]_D-95°$ (methanol, c 0.7).

EXAMPLE 13B a. The procedure according to Example 12A(a) was repeated with the exception of substituting $l$-2-(3,5-dihydroxyphenyl)-3-methyloctane, erythro, Example 11(c), for the dextrorotatary octane, threo, and $l$-2-carbethoxy-5-methylcyclohexanone for the corresponding dextrorotatory hexanone, and gave $l$-1-hydroxy-3-(1,2-dimethylheptyl)-9-methyl-7,8,9,10-tetrahydro-6H-dibenzo[$b,d$]pyrone, erythro, isomer 6, m.p. 135°–137° C., $[\alpha]_D+108°$ (methanol, c 0.6).

b. The procedure according to Example 12A(b) was repeated with the exception of substituting $l$-2-(3,5-dihydroxyphenyl)-3-methyloctane, erythro, Example 11(c), for the dextrorotatory octane, threo, and $l$-2-carbethoxy-5-methylcyclohexanone for the corresponding dextrorotatory hexanone, and gave $l$-1-hydroxy-3-(1,2-dimethylheptyl)-9-methyl-7,8,9,10-tetrahydro-6H-dibenzo[$b,d$]pyrone, erythro, isomer 6, m.p. 135°–137° C., $[\alpha]_D-108°$ (methanol, c 0.6).

EXAMPLE 14 a. A mixture comprising 5.0g methyl iodide in 10 ml of dry ether was added to 0.7 g magnesium and 10 ml dry ether, then refluxed for 20–40 minutes. The d-pyrone, threo, isomer 3, Example 12A(a) in 20 ml of dry benzene was added dropwise, then refluxed for 20–40 minutes. The ether was distilled off and refluxing was continued for 14–18 hours. The mixture was then cooled, ice bath, and a solution of 3.0 g of ammonium chloride in 15 ml water was added dropwise. The mixture was then warmed to room temperature, carefully acidified with a solution of 3 ml of sulfuric acid in 10 ml of water, and stirred for 35–55 minutes. The layers were separated and the aqueous layer was extracted with several portions of benzene, combined, dried and concentrated to a red viscous oil as the pyran which was subsequently converted to the corresponding acetate ester by the following method.

A mixture comprising pyran, 10 ml of acetic anhydride, and 0.35 sodium acetate was refluxed with stirring for 3 hours, cooled, poured over ice and an oil separated. The oil was extracted with petroleum ether, washed with 10sodium bicarbonate solution until no longer acidic. The organic phase was dried, concentrated and then chromatographed on a column (1 × 3.5 in.) of silicic acid in petroleum ether, then eluated with petroleum ether containing 2% ether. The fluorescent 100 ml forerun was discarded, and the product eluted in the second 100 ml fraction. The solvent removed under reduced pressure and produced substantially colorless, clear viscous oil of d-1-acetoxy-3-(1,2-dimethylheptyl)-6,6,9-trimethyl-7,8,9,10-tetrahydro-6H-dibenzo [$b,d$]pyran, threo, isomer 3, $[\alpha]_D+133°$ (methanol, c 0.8).

b. The procedure in accordance with (a) supra was repeated with the exception of substituting the members of the group consisting of $l$-pryone, threo, isomer 4, Example 12A(b), D-pyrone (threo, isomer 1, Example 12B(a));$l$-pyrone (threo, isomer b 2, Example 12B(b)), $d$-pyrone (erythro, isomer 7, Example 13A(a)): $l$-pyrone (erythro, isomer 8, Example 13A(b)), $d$-pyrone (erythro, isomer 5, Example 13B(a)), $l$-pyrone (erythro, isomer 6, Example 13B(b)) for the corresponding $d$-pyrone (threo, isomer 3, Example 12-A(a)) and gave the corresponding pyran acetates the members of the group consisting of $l$-1-acetoxy-3-(1,2-dimethylheptyl)-6,6,9,trimethyl-7,8,9,10-tetrahydro-6H-dibenzo [$b,d$]pyran, threo, isomer 4, $[\alpha]_D-70°$,(methanol, c 0.7); $d$-1- acetoxy-3-(1,2-dimethylheptyl)-6,6,9,trimethyl-7,8,9,10-tetrahydro-6H-dibenzo [$b,d$] pyran, threo, isomer 1, [$\alpha$]$_D$ +65° (methanol, c 06.); $l$-1-acetoxy-3(1,2-dimethylheptyl)-6,6,9-trimethyl-7,8,9,10-tetrahydro-6H-dibenzo [$b,d$]pyran, threo, isomer 2, $[\alpha]_D-130°$ (methanol, c 0.8); $d$-1-acetoxy-3-(1,2-dimethylheptyl)-6,6,9-trimethyl-7,8,9,10-tetrahydro-6H-dibenzo[$b,d$]pyran, erythro, isomer 7, $[\alpha]_D+105°$ (methanol, c 0.7); $l$-1-acetoxy-3-(1,2-dimethylheptyl)-6,6,9-trimethyl-7,8,9,10-tetrahydro-6H-dibenzo[$b,d$]pyran, erythro, isomer 8, $[\alpha]_D-93°$ (methanol, c 0.5); $d$-1-acetoxy-3-(1,2-dimethylheptyl)-6,6,9-trimethyl-7,8,9,10-tetrahydro-6H-dibenzo [$b,d$]pryan, erythro, isomer 5, $[\alpha]_D+94°$ (methanol, c 0.6); $l$-1-acetoxy-3-(1,2-dimethylheptyl)-6,6,9-trimethyl-7,8,9,10-tetrahydro-6 H-dibenzo[$b,d$]pyran, erythro, isomer 6, $[\alpha]_D-110°$ (methanol, c 0.6).

We claim:

1. A compound of the following structure

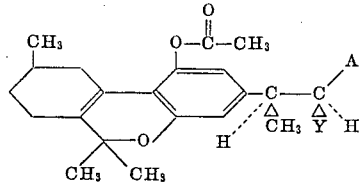

Wherein

When A is —CH$_3$ then Y is —C$_5$H$_{11}$

When A is —C$_5$H$_{11}$ then Y is —CH$_3$ and the compound being an optically active isomer.

2. d-1-acetoxy-3-(1,2-dimethylheptyl)-6,6,9,trimethyl-7,8,9,10-tetrahydro-6H-dibenzo [b,d] pyran, threo, [α]$_D$ +65° (methanol, c 0.6).

3. l-1-acetoxy-3-(1,2-dimethylheptyl)-6,6,9-trimethyl-7,8,9,10-tetrahydro-6H-dibenzo [b,d]pyran, threo, [α]$_D$ −130° (methanol, c 0.8).

4. l-1-acetoxy-3-(1,2-dimethylheptyl)-6,6,9-trimethyl-7,8,9,10-tetrahydro-6H-dibenzo [b,d] pyran, threo, [α]$_D$ −70°, (mehtanol, c 0.7).

5. l-1-acetoxy-3-(1,2-dimethylheptyl)-6,6,9-trimethyl-7,8,9,10-tetrahydro-6H-dibenzo [b,d]pyran, erythro, [α]$_D$ −110° (methanol, c 0.6).

6. The method for preparing isomers of 1-acetoxy-3-(alkyl)-6,6,9-trimethyl-7,8,9,10-tetrahydro-6H-dibenzo [b,d]pyran comprising the steps of: (a) treating an isomeric mixture of an alkyl-dialkoxyhydrocinnamic acid with dicyclohexylamine forming the corresponding salt and filtrate I and hydrolyzing said salt in a solution comprising a lower alkyl alcohol and mineral acid to the erythro, dl-alkyl-dialkoxyhydrocinnamic acid, (b) treating said filtrate I with benzylamine forming the corresponding salt and hydrolyzing said salt in a solution comprising a lower alkyl alcohol and mineral acid to the threo dl-alkyl-dialkoxyhydrocinnamic acid (c) treating the compound selected from the group consisting of erythro and threo dl-alkyl-dialkoxyhydrocinnamic acid with the separate optically-active form of α-methylbenzylamine producing the separate isomers of amine salts selected from the group consisting of d-erythro, l-erythro, d-threo and l-threo alkyl-dialkoxyhydrocinnamic·α-methylbenzylamine and hydrolyzing said separate amine salts in an aqueous alkaline solution, then acidifying to the four isomer acids selected from the group consisting of d-erythro, l-erythro, d-threo and l-threo alkyl-dialkoxyhydrocinnamic acid, (d) reducing said four isomer acids comprising lithium aluminum hydride and solvent with subsequent acidification to the alcohol isomers selected from the group consisting of d-erythro, l-erythro, l-threo and l-threo alkyl-(dialkoxyaryl)alkanol, treating said alcohol isomers with P-toluenesulfonyl chloride to the esters, and reducing said esters with lithium aluminum hydride and solvent, to the octane isomers selected from the group consisting of d-erythro, l-erythro, d-threo and l-threo (dialkoxyaryl)alkyloctane, (e) treating said octane isomers with the separate optically-active form of 2-carbethoxy-5-methylcyclohexanone, solvent and phosphorus oxychloride and separating the eight isomers of 1-hydroxy-3-(alkyl)-9-methyl-7,8,9,10-tetrahydro-6H-dibenzo[b,d]pyrone, (f) treating said eight pyrone isomers with methyl magnesium iodide producing isomers of 1-hydroxy-3-(alkyl)-6,6,9-trimethyl-7,8,9,10-tetrahydro-6H-dibenzo[b,d]pyran, (g) treating the isomers of the pyran with acetic anhydride converting the hydroxy group to an acetoxy group.

* * * * *